July 26, 1960
E. JUSTI ET AL
2,946,836
GAS DIFFUSION ELECTRODE
Filed Jan. 9, 1956
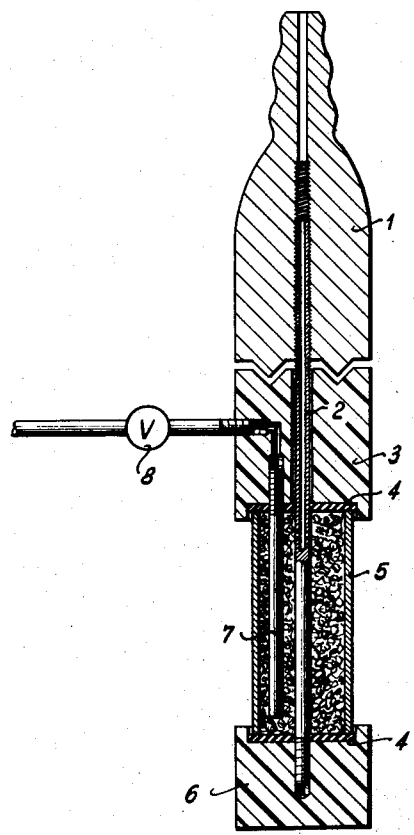
INVENTORS
EDUARD JUSTI, GERHARD RECKERT, AUGUST WINSEL
by Burgess, Dinklage & Sprung
ATTORNEYS

United States Patent Office 2,946,836
Patented July 26, 1960

2,946,836

GAS DIFFUSION ELECTRODE

Eduard Justi, Gerhard Reckert, and August Winsel, Braunschweig, Germany, assignors to Ruhrchemie Aktiengesellschaft, Oberhausen-Holten, Germany, and Steinkohlen-Elektrizitat Aktiengesellschaft, Essen, Germany Filed Jan. 9, 1956, Ser. No. 558,094

Claims priority, application Germany Jan. 12, 1955

6 Claims. (Cl. 136—86)

This invention relates to an improved gas diffusion electrode.

Gas diffusion electrodes are known and have been used in fuel cells to obtain electrical energy directly by the oxidation of combustible gases rather than by proceeding through the lower grade heat energy produced by ordinary combustion. Fuel cells consist of an electrolyte bath such as a potash lye bath, equipped with two gas diffusion electrodes. The gas diffusion electrodes consist of a hollow body of a suitable electrically conductive porous material such as carbon or sintered metal. A combustible gas such as hydrogen, carbon monoxide, methane, ethylene, etc., is passed into one of the two electrodes at a slightly super-atmospheric pressure and is adsorbed on the porous solid electrode body and then displaced therefrom by the inflowing combustible gas. In this desorption the combustible gas leaves an electron behind and migrates into the bath as a positive ion. Thus, for example, in the case of hydrogen each H atom leaves an electron behind in the electrode and diffuses into the electrolyte as an $H^+$ ion thereby charging the combustible gas electrode negatively. Oxygen or an oxygen-containing gas is passed into the interior of the other gas diffusion electrode at a slight super-atmospheric pressure. The oxygen is adsorbed, then deadsorbed in the same manner as the combustible gas migrating into the electrolyte solution in the form of a negatively charged $O^-$ ion leaving the oxygen electrode positively charged. The combustible gas electrode thus forms the cathode and the oxygen electrode forms the anode of the cell. The negatively charged ions from the anode combine with the positively charged ions from the cathode in the electrolyte forming the oxidation product. Thus, in the case of hydrogen as a combustible gas and oxygen, the $O^-$ ion combines with the $H^+$ ions forming neutral water.

The current strength of the fuel cell is thus determined by the number of ions combining per unit time to form the oxidation product. According to the first law of thermodynamics, the electrical energy supplied by the cell must be equal to the heat of oxidation when no other forms of energy are involved. Therefore, the electromotive force E of the cell is proportional to the heat of oxidation and the operating voltage of the cell, according to Ohm's law, is equal to E reduced by the voltage drop, $I.R_i$, where I is the operating current strength and $R_i$ is the internal resistance of the cell. $R_i$ is additively composed of the both resistances $R_A$ of the individual paths of current (for bodies of uniform cross section, $q$, ($R_A = \rho \cdot 1/q$) and the contact resistances $R_k$ between the boundaries of parts in contact with each other.

The porous electrode body of the fuel cell electrodes are generally constructed as hollow open-ended tubes for convenience and economy in manufacture. Each tube end was ground flat and sealed with a metallic washer of a highly conductive material which served as the contact for removing the electric current generated by the electrode body. These metallic washers forming the contacts were in turn connected to a current tap to which the electric lead was connected to the cell. The current tap could, for example, consist of a metal cap electrically connected to the metallic washers by means of a tie rod which extended through the central hollow portion of the tubular body holding the washers in place. In the case of the combustible gas electrode, combustible gas was passed to the interior of the hollow body through an appropriate conduit and, in the case of the oxygen electrode, oxygen or an oxygen-containing gas was passed to the interior of the electrode body.

With this conventional construction, the current would pass through the various portions of the electrode body to the metallic washers forming the contacts and the internal resistance of the cell $R_i$ was additively composed of the both resistances $R_A$ of the individual paths of current and the contact resistances $R_k$ between the boundaries of the parts in contact with each other.

Since the voltage generated by fuel cells is generally below about 1.5 volts it is necessary to have the lowest internal resistance possible in order to allow the withdrawal of the highest current strength possible and to obtain a high energy efficiency. The contact resistances $R_k$ of fuel cell electrodes of conventional construction were, however, generally high.

One object of this invention is a substantial reduction in the contact resistances $R_k$ of fuel cell electrodes thus allowing a higher energy efficiency. This and still further objects will become apparent from the following description read in conjunction with the drawing which shows a vertical cross-section of an embodiment of a fuel cell electrode in accordance with the invention.

The gas diffusion electrode for a fuel cell, in accordance with the invention, has a conventional porous electrode body such as a hollow porous electrode body and a current tap such as a metallic terminal to which a current lead is attached for withdrawing current generated by the cell. In accordance with the invention, electrically conductive granules are positioned in contact with the electrode body and means are provided establishing an electric connection between these electrically conductive granules and the current tap so that the electrical contact between the porous electrode body and the tap is wholly or partially effected by means of these electrically conductive granules. Preferably, the porous electrode body is a hollow body with the electrically conductive granules positioned therein in a manner similar to that of the interior of a granulated carbon transmitter. The electrically conductive granules may be granules of metal or carbon and particularly partially graphitized carbon. In place of the metal or carbon granules, materials with metallic conduction have been found particularly suitable, such as nitrides or carbides of titanium and heavy metals as, for example, TiC, TiN, WC, MoC. Mixtures of these substances, as for example, as are used as hard metals for cutting tools, may also be employed. It is preferable to use metallic grains of stainless steel which are resistant to aqueous alkaline solutions. The grain sizes should range between 0.5 and 5 mm., the preferred grain size being 1 to 3 mm. diameter.

The term "compounds with metallic conduction" as used herein is intended to designate compounds which correspond to Friedrich's rule. In accordance with this rule it is stated that a good electronic conduction can be expected in solid chemical compounds if chemical valencies are not utilized by linkage forces. Particular valency electrons are then available for current conduction. Exact details on this subject are contained in E. Justi, "Leitfähigkeit and Leitungsmechanismus fester Stoffe," Gottingen, 1938, pages 167–168.

It is of particular advantage in accordance with the invention to prepare the granules by sintering together powders with the use of cobalt as a binding agent.

The invention will be described in further detail with reference to the embodiment shown in the accompanying drawing.

The electrode has the porous electrode body 5 formed in the conventional manner of carbon or sintered metal in the shape of an open-ended tube of any desired cross-section such as a circular, oval or rectangular cross-section. The hollow porous electrode body 5 is sealed at its open ends by the rubber washers 4 held in place on the top by an intermediate member 3 of insulation material as, for example, an alkali resistant casting resin "Araldit B" (a condensation product obtained by reacting epichlorohydrin with bisphenols) of Ciba A.-G., Basel, and at the bottom by a similar insulating piece. The insulating pieces 3 and 6 are held in position and maintain the rubber washers 4 in contact with the edges of the tubular porous electrode body 5 by means of a metal tube 2 which extends therethrough in the manner of a tie rod. The tube 2 is screwed directly into the insulating member 6 and extends through the insulating member 3. A current tap in the form of a metal head or terminal 1 is positioned on top of the insulating member 3 as a continuation thereof. The other end of the hollow tie rod 2 is screwed into this metallic tap or terminal so that by means of the tie rod 2 the metallic tap 1 and the insulating body 6 are pressed and maintained toward each other holding the other parts of the electrode in place and pressing the edges of the tubular porous electrode body in sealing contact with the rubber washer 4. The hollow interior of the tie rod 2 extends through from the upper end to the interior of the hollow porous electrode 5 in the manner of a duct or conduit. The interior of this duct or conduit is in communication with the interior of the hollow porous electrode body 5 by means of small radial bores or passage ways. The lower portion of the tie rod 2 as shown, has a solid construction. A bore extends through the upper portion of the metallic current tap 1 in communication with the conduit formed in the interior of the tie rod 2. The upper portion of the current tap is formed as a hose connection with the undulated shape as shown, over which a rubber hose may be slipped and will be maintained in place. Gas may thus be passed through this hose through the bore in the current tap 1 through the hollow portion of the tie rod 2 into the interior of the hollow porous electrode body 5.

In accordance with the invention, the hollow porous electrode body is filled with electrically conductive granules such as granules of metal, carbon, compounds with metallic conduction such as nitrides or carbides, of titanium or heavy metals, in a manner similar to that of the interior of a granulated carbon transmitter. These electrically conductive granules are positioned in contact with the wall of the hollow porous electrode body 5 and in contact with the tie rod 2 which is constructed of a metal having good conductive properties. The electrically conductive granules thus establish the electrical connection between the porous electrode body 5 which becomes charged upon the ionization and the tie rod 2 which in turn, is electrically connected to the current tap 1. A conventional electrical lead may be connected in any desired manner to the current tap 1 for utilizing the electrical energy produced by the cell.

In operation the electrode is immersed in the electrolyte bath such as a potash lye bath spaced apart from a similar electrode forming a fuel cell. A combustible gas, such as hydrogen, carbon monoxide, methane, ethylene, or the like, is passed into one of the electrodes through the bore in the current tap 1 through the hollow interior of the tie rod 2 to the interior of the porous electrode body 5 under a slight super-atmospheric pressure so that the gas is forced into the pores of the electrode body 5, adsorbed by the pores and then displaced by further gas being passed into the porous electrode body, entering the electrolyte bath after the deadsorption in the form of a positive charged ion. In the same manner, oxygen-containing gas, such as oxygen itself, or air, is passed into the other electrode forming the oxygen electrode which, after the adsorption and deadsorption migrates into the electrolyte solution as a negative ion. The metallic current taps 1 of the two electrodes form the terminals of the cell to which the desired current leads are attached.

By effecting the electrical contact between the electrode body 5 and the tie rod 2 and thus the current tap 1 by means of the electrically conductive granules, the contact resistances $R_k$ of the electrode are substantially reduced so that the internal resistance $R_i$ of the cell is substantially reduced, greatly increasing the current strength which may be obtained and the efficiency of the cell.

In the operation of conventional fuel cells, as is well known, unless a pure combustible gas and a pure oxygen are used, the electromotive force generated by the cell gradually decreases operation. Since, however, the cost of using chemically pure combustible gases and oxygen is relatively high thereby diminishing the advantage of the fuel cell over the conventional method of generating current by means of heat engines and dynamos, it would be highly desirable to operate the fuel cells with impure gases such as technical gas mixtures. In accordance with a preferred embodiment of the invention, this is made possible so that, for example, the combustible gas electrode can be operated with technical hydrogen containing a few percent of impurity such as nitrogen or with gas mixtures such as municipal gas, synthesis gas, natural gas, blast furnace gas, producer gas, water gas, etc.

As mentioned, when operating the combustion gas electrode with technical hydrogen, a gradual decrease in voltage of the cell occurs. By measuring the electromotive force of both the electrodes with respect to a normal calomel electrode, it is observed that the trouble arises at the combustible gas electrode and not at the oxygen electrode. This observation would suggest a poisoning of the electrode material by certain impurities in the hydrogen used. Such a poisoning effect, however, is not confirmed since the same gradual decrease in the electromotive force of the fuel cell occurs when hydrogen is used, which is free from impurities but admixed with secondary inert constituents such as nitrogen.

The phenomenon can be explained as a difference in the diffusion rates of the different constituents of a gas mixture. At first, the lightest molecules, i.e., those of hydrogen, are selectively adsorbed in the electrode wall with a gradual enrichment of the heavier molecule, i.e., of the nitrogen in the case specified above, directly above the electrode surface. This cushion of the electro-chemically less active molecules, screens the adsorbent off against further access of the active molecules such as the hydrogen, thereby interrupting the current-producing process to a more or less large extent. If, for example, a conventional cheap fuel gas mixture containing, for example, hydrogen, methane, carbon monoxide, nitrogen or carbon dioxide is used instead of a mixture of nitrogen and hydrogen, the constituents are adsorbed and ionized in about the order given above, based on their average molecular velocity, resulting in a stage-wise disassociation and voltage reduction.

In accordance with the preferred embodiment of the invention which allows the use of these gas mixtures of the impure fuel gas, this choking effect is avoided by providing means for periodically blowing-off the accumulated inactive or less active gas cushion as the same occurs. The blowing off may be actuated by a decrease in the current or voltage occurring in the cell. In order to effect this, an exhaust conduit may be provided from the hollow interior of the porous electrode body with a valve sealing the exhaust conduit and means provided for opening the valve controlled by electricity from the current tap. In the embodiment shown in the drawing, an exhaust conduit 7, in the form of a riser pipe extends into the interior of the porous electrode body. A continuation of the exhaust conduit extends through the insulating body 3 and a conduit containing the valve 8 which may be opened electro-magnetically or pneumatically and controlled by means of a contact volt meter or a contact ammeter by the voltage or current strength of the cell. As soon as the voltage or current strength drops below a certain value which can be pre-set the electro-chemically less active gas accumulated is blown off through the valve. The valve can be independently reset to close after a pre-determined time period or after the initial voltage and/or amperage or a predetermined voltage or amperage has been reached by the purging with the inflowing fresh gas. It is preferable to effect the closing of the valve 8 after a predetermined time period if as small a loss as is possible of the fresh gas used in the purging is desired. This purging through the blow-off valve can, however, only remove such relatively inactive gas constituents which are not yet present in the pores of the electrode body.

It is necessary in operating fuel cells with diffusion electrodes that the electrodes exhibit as uniform a cross section as is possible. This is for the following reason:

An equilibrium must prevail in the pores between the capillary pressure of the electrolyte on the liquid side, on the one hand, and the gas pressure of the fuel or oxygen, on the other hand. In the case of a normal gas pressure as it is conventionally used (about 1½ atmospheres) this diameter is about $8\mu$. If, with a constant gas pressure, the capillary diameter is smaller, then the electrolyte will be drawn into the pore system like water into a sponge, i.e. the electrode is "drowned." If, conversely, the gas pressure is higher, the electrolyte is forced out of the pores and the electrode will likewise stop to work. In accordance with the invention, the electrode diameter is made slightly larger than the "equilibrium" diameter, i.e. the diameter at which capillary pressure and gas pressure are in equilibrium. In this way, there is obtained a certain "bubbling effect," i.e. a larger gas bubble emerges from time to time while, in the remaining time, the electrode is in normal operation. Since the inert constituents of the gas are not adsorbed, the emerging gas bubble consists preferably of inert gas, i.e. the effect desired is reached. It is very difficult, however, to state the suitable pore diameter in figures since the same is dependent, on the one hand, upon the gas pressure which is determined by the technical circumstances and, on the other hand, upon the type of gases used (whether that of the fuel gases or the oxygen on the oxygen electrode side which is mixed with nitrogen). The pore diameter required for the effect mentioned above can be estimated to be in the order of magnitude of about 20 to 50% above the "equilibrium diameter."

In accordance with a further embodiment of the invention, the gas diffusion electrode of the fuel cell is constructed so that the choking effect due to the accumulation of the relatively inactive gas constituents is avoided even in connection with inactive gas constituents which have accumulated in the pores of the electrode body.

In the prior art, it was generally believed desirable to make the pores of the electrode body as small as possible so that the gas could only diffuse therethrough but could not flow therethrough to form small bubbles in the electrolyte without delivering electrical power.

In direct contrast to this, in this latter preferred embodiment of the invention the pores of the electrode body are made sufficiently large so as to allow a continuous loss of the fuel gas therethrough which effects a continuous blowing out of the relatively inert constituents which accumulate in the pores, thus eliminating the choking effect. In operation with this preferred construction, a continuous slight flow of gas bubbles may be observed emerging from the electrode body wall.

The relative volume of the gas which may escape through the pores should be selected by a suitable selection of the pore size so that the same corresponds to the content of relatively inert gas in the gas which is supplied to the electrode and may amount to, for example, 80% by volume, or may be as low as 3% by volume.

It is preferable to use the embodiment with the exhaust conduit blow-off valve in combination with the embodiment having the enlarged pores since one serves to effect a reduction of the choking effect on the surface of the electrode body while the other serves to reduce this choking effect in the pores.

The embodiments apply equally well to electrodes which are to be used as the fuel gas electrodes or oxygen electrodes, i.e., the anodes or cathodes. The embodiment is particularly adaptable in connection with an anode if atmospheric air is to be used instead of pure oxygen.

While it is preferable to use the preferred embodiment in combination, the same may also be used singularly. Thus the embodiment in which the purging is effected by the blowing off of the inert gases through a valve, is preferable in connection with gases containing a relatively small amount of impurities while the purging through the wide pores is preferably effected with highly contaminated gases as, for example, an air operated electrode which, for example, requires that about 80% nitrogen be blown off.

In connection with the oxygen electrode which is operated with air, it is often desirable to make the pore sizes sufficiently small so that all of the nitrogen which will accumulate will not be blown off thus avoiding an undue loss of the oxygen into the electrolyte and to provide the periodically operating blow off valve which is opened periodically to blow off the nitrogen cushion which does accumulate due to the pore size.

While the invention has been described in detail with reference to the specific embodiment shown, various changes and modifications will become apparent to the skilled artisan which fall within the spirit of the invention and scope of the appended claims.

The connections set forth above for the most favorable pore diameter and the gas pressure were not known up to the present. For example, use was made of electrodes with a pore diameter which was far too large. Thereby, an unnecessarily great part of the utilizable portion of the gas mixture was lost. A complete gas separation in the sense that only the inert portion is blown off while the utilizable portion is converted cannot be reached even by selecting a suitable pore diameter. The electrode will operate most favorably if only a part of the inerts flows through (by the bubbling effect mentioned above). Thereby, however, the residual portion of the inerts is retained in the gase space of the electrode where it forms the gas cushion mentioned above. In accordance with the invention, this gas cushion shall be removed from time to time by blowing off the whole gas accumulated on the gas side of the electrode and enriched with inerts and replacing the same by fresh gas. The beginning decrease in performance of an electrode due to an inert gas cushion is perceptible from the fact that its voltage with respect to a reference electrode drops. From this effect, a signalling voltage which actuates the blow-off mechanism by opening the valve 8 can be derived in the conventional manner.

We claim:

1. In a gas diffusion electrode for a fuel cell having a hollow porous electrode body and a current tap, the improvement which comprises electrically conductive granules positioned in the hollow interior of said hollow electrode body and in conductive connection with said current tap said electrically conductive granules establishing electrical connection between said electrode body and said current tap, conduit means for passing a gas to the hollow interior of said hollow electrode body, an exhaust conduit from said hollow interior, a valve sealing said exhaust conduit and means for opening said valve controlled by the electricity from said current tap.

2. Improvement according to claim 1, in which the pores of said porous electrode body are formed sufficiently large to allow the continuous flow of gas therethrough for the blowing off of inactive gas constituents.

3. In a gas diffusion electrode for a fuel cell having a hollow porous electrode body and means for passing gas into the hollow interior of said porous electrode body, the improvement which comprises an exhaust conduit from the hollow interior of said porous electrode body, a valve sealing said exhaust conduit and means for opening said valve, controlled by the electricity from the electrode.

4. A gas diffusion electrode for a fuel cell comprising a hollow open-ended tubular porous electrode body, a first washer of resilient electrically resistant material sealing one open end of said electrode body, a second washer of resilient non-electrically conductive material sealing the other open end of said electrode body, a first insulating member maintaining said first washer in place, a second insulating member maintaining said second washer in place, a metallic tap connection positioned adjacent the end of said second insulating member opposed to said electrode body, a tie rod of electrically conductive material secured to said first insulating member extending through the hollow interior of said electrode body through said second insulating member and secured to said metallic tap connection, said tie rod defining a gas conduit therein terminating in the hollow interior of said electrode body, and electrically conductive granules filling the hollow interior of said electrode body in contact therewith and said tie rod.

5. A gas diffusion electrode according to claim 4, in which said metallic tap connection defines a hose connection portion with a bore extending therethrough as a continuation of the conduit defined through said tie rod.

6. A gas diffusion electrode according to claim 5, including an exhaust conduit from the hollow interior of said electrode body and valve means sealing said exhaust conduit.

References Cited in the file of this patent

UNITED STATES PATENTS

| 913,390 | Jungner | Feb. 23, 1909 |
| 2,615,931 | Hatfield | Oct. 28, 1952 |
| 2,620,371 | Bowditch | Dec. 2, 1952 |

FOREIGN PATENTS

| 14,397 | Great Britain | 1897 |
| 521,773 | Great Britain | May 30, 1940 |
| 667,298 | Great Britain | Feb. 27, 1952 |
| 723,022 | Great Britain | Feb. 2, 1955 |